May 22, 1956  H. E. ENGLESON ET AL  2,746,594
ENDLESS CONVEYER

Filed Aug. 30, 1954  2 Sheets-Sheet 1

INVENTORS:
HARRY E. ENGLESON
ELMER D. SRAMEK

BY Margall, Johnston Cook + Root.
ATT'YS

May 22, 1956   H. E. ENGLESON ET AL   2,746,594
ENDLESS CONVEYER
Filed Aug. 30, 1954   2 Sheets-Sheet 2
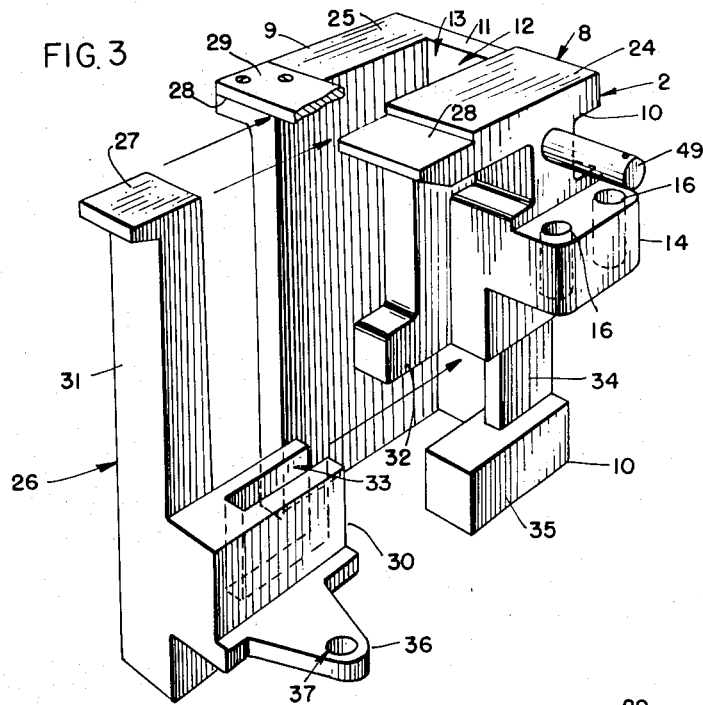
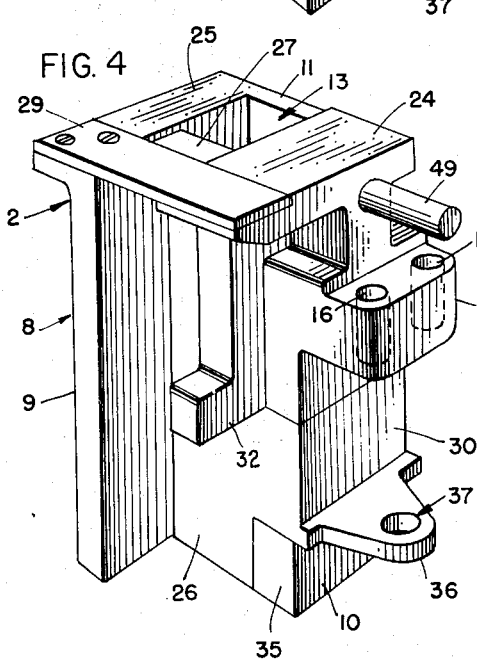
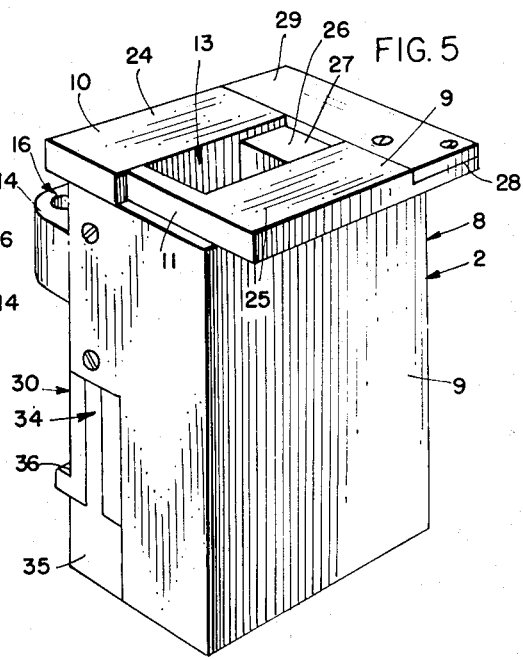
INVENTORS:
HARRY E. ENGLESON
ELMER D. SRAMEK
BY Margall, Johnston, Cook + Root.
ATT'YS

United States Patent Office 2,746,594
Patented May 22, 1956

2,746,594

ENDLESS CONVEYER

Harry E. Engleson, Chicago, and Elmer D. Sramek, Cicero, Ill., assignors to F. B. Redington Co., Chicago, Ill., a corporation of Delaware Application August 30, 1954, Serial No. 452,756

16 Claims. (Cl. 198—151)

This invention relates to an endless conveyer of the type embodying a plurality of adjacently arranged buckets connected to an endless chain.

The invention comprises in general a plurality of adjacently arranged buckets, which are detachably connected to an endless chain, each bucket having a measuring pocket or compartment to measure a predetermined quantity of bulk flowable material such as beans, candy, coffee and the like. The material flows from each bucket and is deposited into cartons which are located immediately below the pockets of the buckets when the buckets arrive at a particular unloading or dispensing position. Each bucket, in and of itself, is constructed in a particular manner, and has a movable end wall so that the size of the bucket measuring pocket to be filled may be varied depending upon the type, kind and condition of the material to be measured and packed. The brackets are adjacently located, and are detachably mounted on pins of a roller chain, thereby forming an endless conveyer which is driven by a sprocket by means of the sprocket teeth engaging the links of the chain. The adjustable movable end wall is so constructed and arranged that there will be no interference from adjacent buckets, or with the operation of the chain by the adjustment of the end wall for increasing or decreasing the size of the measuring pocket of the bucket. Each movable end wall of each bucket is connected to an endless chain, also driven by a sprocket, so that every bucket may have its measuring pocket simultaneously adjusted by shifting the chain to operatively adjust each movable end wall.

The primary object of the present invention is to provide a new and improved conveyer structure made up of a plurality of adjacently arranged demountable buckets which are mounted on pins of an endless roller type chain, there being an adjustable end wall for each bucket to increase or decrease the size of all the measuring pockets simultaneously.

Another object of the invention consists in the provision of an improved endless conveyer made up of an endless roller chain to which a plurality of adjacently arranged buckets are connected, said buckets having measuring pockets provided therein, the pockets of all buckets being provided with novel means to adjust simultaneously the size of each pocket, permitting the pocket size of each bucket to be decreased or increased by the shifting of an endless chain to which movable end walls of the buckets are connected.

A further object consists in a new and novel arrangement, construction and location of parts to provide a strong and durable bucket conveyer; at least one end wall of each bucket being movable and adjustable so as to accommodate different kinds and types and sizes of material, and to accommodate materials which may shrink or expand according to weather conditions, or otherwise; all the movable end walls being adjusted simultaneously by the shifting of an endless chain to which each movable end wall is connected.

A further object of the invention resides in the provision of adjacently positioned buckets connected to an endless chain arranged on one side of the buckets, there being an endless chain located on the same side of the bucket as the other chain and connected to a movable end wall to simultaneously adjust all the movable end walls and thus decrease or increase the size of each pocket of each bucket simultaneously.

Numerous other objects and advantages will be apparent throughout the progress of the specification which is to follow.

The accompanying drawings illustrate a certain selected embodiment of the invention, and the views therein are as follows:

Fig. 3 is a detail exploded perspective view showing various parts of the bucket construction;

Fig. 4 is a detail perspective view of a bucket showing the inner side wall and the adjustable end wall thereof; and Fig. 5 is a detail perspective view of a bucket showing the outer side wall and the closed end wall thereof.

Figure 1:
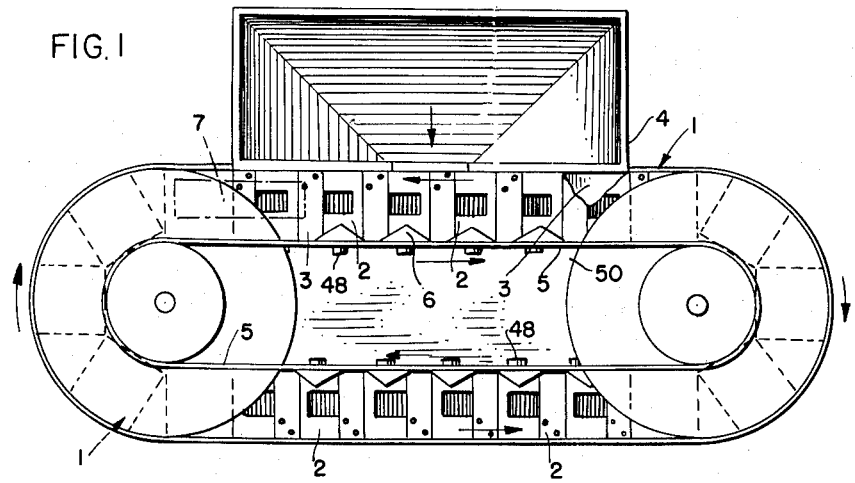
Fig. 1 is a detail top plan view of a package filling machine and embodying the present invention.

The particular machine to which the present invention is adapted to be applied is a filling machine as manufactured by the F. B. Redington Co. of Chicago, and comprises an endless conveyer 1 made up of a plurality of interconnected buckets 2, which are suitably supported on a supporting plate 3 mounted on the machine frame. The lower open ends of the various buckets 2 are slidably supported upon the supporting plate or shelf 3, Fig. 1, which completely surrounds the conveyer 1, being provided with an elongated slot therein which is coextensive with the package filling zone, the plate 3 being imperforate throughout the remaining regions thereof. The plate 3 is disposed at a level slightly above the level of the open ends of various packages which pass through the package filling zone, and its outer edge region is supported upon a longitudinal bar forming a part of the machine framework. The cartons are transported beneath the buckets 2 so that the material in the pockets of the buckets may be deposited in the cartons, whereby the contents of each bucket 2 may be deposited in a carton which is in alinement with its proper bucket 2. The cartons may be of any shape desired, but may be relatively rectangular in cross section to cooperate with the pockets, which also may be rectangularly shaped in cross section.

The framework of the filling machine supports a hopper which is provided with a relatively straight front wall and inwardly tapered or inclined opposed side walls. The front wall of the hopper 4 is provided with a chute which may be adjustable by gates, whereby the material in the hopper will be fed out of the hopper opening and deposited on the upper surfaces of the buckets 2 which comprise the conveyer 1. An endless belt 5 is trained over spaced pulleys and has secured thereto, at spaced points therealong, a plurality of rake or scraper elements 6 of lobe shaped design, having flat bottom surfaces adapted to rest squarely on the upper surfaces of a flange or plate, as well as resting on top of the flange ends of the buckets 2. The scraper elements traverse the upper ends of the buckets and scrape or rake the excess material resting on top of the buckets, and by a camming action impel the particles of the material into the openings of the buckets 2. The belt 5 operates in a direction opposite to the movement of the conveyer 1 and thus causes material lying on top of the buckets to be swept back or raked into the openings or pockets of the buckets. A brush 7 operates in a direction opposite to the directional movement of the conveyer 1, so that the ends of the brush will sweep material lodged on top of the conveyer 1 inwardly, and thus assist the rake elements of the belt 5 in directing the material into the pockets or openings of the buckets.

The construction and operation of the filling machine is disclosed and claimed in the application of Clarence J. Malhiot, Serial No. 163,249, filed May 20, 1950, and one form of bucket conveyer having adjustable end walls is disclosed in applicants' copending application Serial No. 452,128, filed August 25, 1954, each assigned to the present assignee.

The particular construction herein shown for the purpose of illustrating the present conveyer and bucket construction comprises a conveyer 1 composed of adjacently arranged buckets 2. Each bucket 2 comprises a main body part 8 which may be cast as a single unitary unit from brass or other suitable metal, but is preferably cast in two parts for ease and convenience in molding and machining.

The body 8 may comprise two sections, which when connected together constitute, in effect, a channel shaped member having an outer side leg 9, Figs. 2 to 5, and an inner side leg 10. The outer leg 9 has an integral projection at one end forming a rigid end wall 11 for the body 8. An elongated slot 12, Fig. 3, formed by the spaced apart legs 9 and 10, is open at one end and forms an opening or part of a measuring pocket 13 into which the material to be packaged is received and measured. In cases where the body 8 is formed of two parts as shown, the two legs 9 and 10 may be bolted or riveted together, whereby the body 8 forms a unitary element.

Figure 2:
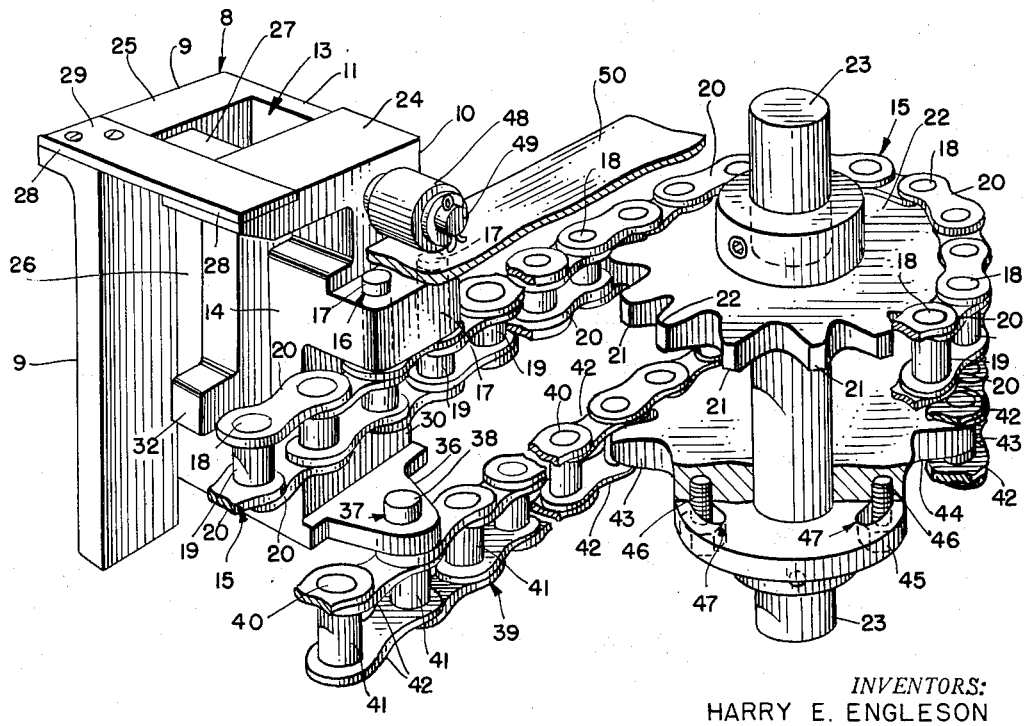
Fig. 2 is a detail perspective view showing the manner in which the buckets are removably mounted on an endless chain, and the manner in which the movable end walls of each bucket are connected to a second endless chain to simultaneously adjust all movable end walls simultaneously.

The inner leg 10, Fig. 2, is provided with an inwardly extending thickened boss or flange 14 which is formed integrally on its inner surface to provide means for hingedly connecting the buckets 2 to an endless roller chain 15. The projection or boss 14 is provided with spaced holes 16 at the ends thereof to receive upstanding elongated pins 17, Fig. 2. The elongated pins 17 and the regular link pins 18 have rollers 19 mounted thereon. The pins 17 and 18, the rollers 19 and the upper and lower chain link 20 form the roller chain 15, the spaces between the links being engaged by teeth 21, Fig. 2, of a sprocket 22. The chain 15 is a conventional roller chain, except for the elongated upstanding pins 17 which allow the buckets 2 to be demountable on the chain which drives the buckets. The chain 15 is an endless chain and is driven by the sprocket 22 which is mounted on a driven shaft 23 mounted in suitable bearings in the filling machine frame.

The inner side leg 10 of the body 8, Figs. 2 to 5, has a flange 24 at its upper end to form a top. The flange 24 terminates at the end of the closed end wall 11 of the leg 9, and is flush with said wall. The side of the flange 24 overhangs from a side of the body 8; and the forward end of the flange 24 is flush with the forward end of the leg 10.

The outer side leg 9, Figs. 2 to 5, has an integral outwardly extending flange 25 at its upper end which is in the same plane as the flange 24. The flange 25 is somewhat narrower than the flange 24 and projects less from the outside of the outer side wall than does the flange 25 with respect to the outer surface of the leg 10, but in all other respects is the same as the flange 24.

Each bucket 2, Figs. 3 to 5, includes a movable end closure wall 26 to close the open slotted end 12 which is part of the measuring pocket 13 in the body part 8. The closure wall 26 is of a size to permit it to fit freely within the space defined by the legs 9 and 10 but still be close fitting enough to prevent the material in the pocket 13 from falling out between the sides of the closure 26 and the inside walls of the legs 9 and 10 which define the side walls of the pocket 13. The closure 26, Fig. 3, has an upper end 27 which is equal in size to the rest of the closure body, and is substantially equal to the width of the slot 12, defining the pocket 13, and is flush with the top of the reduced or rabbeted ends 28 of the flanges 24 and 25. The ends of the legs 9 and 10 are rabbeted or recessed as at 28, so that when a top closure plate 29 is applied, the top 27 of the movable end closure wall 26 will be free to be slid or shifted therebeneath. The top closure plate 29 is equal in thickness to the depth of the recesses or rabbets 28 so that when the plate 29 is applied in position, it will be flush with the tops of the flanges 24 and 25 of the legs 9 and 10 respectively.

The movable end closure wall 26, Fig. 3, has a thickened support guide projection 30, Fig. 3, extending from its inner side at its lower end, said projection being integral with the main body part 31, which extends upwardly therefrom. The guide projection 30 engages and supports a foot 32 projecting endwise from the leg 10 of the body 8. This guide projection 30 is provided with an elongated slot 33, Fig. 2, which receives a reduced end 34 of the leg 10, being integral with the foot-like base part 35 of the leg. The adjustable movable end wall 26 is thus supported and guided by the slot 33 having engagement with the leg 10, the body of the end wall between the legs 9 and 10 and the foot 32 on top of the projection 30. Also, the under side of the projection 30 may bear against or be guided or supported by the base part 35 of the leg 10. The closure wall 26, therefore, may be adjustably shifted lengthwise to any position within the limits of the width of the member 27.

The overall size of each bucket 2 is identical, but the size of each measuring pocket 13 may be varied in one dimension to increase or decrease the size of all pockets equally and simultaneously so as to meet certain conditions.

The projection 30 on the inner surface of the inside leg 10 of each bucket 2 has an integral ear or tongue 36 extending inwardly therefrom, which is on the same side of the leg 10 as the boss or flange 14 is located. Each ear 36 is provided with a hole 37 which receives a pin 38 of a roller chain 39, Fig. 2. The pin 38 is longer than the ordinary pins 40 of the chain 39. The pins 40, as well as the pins 38, carry rollers 41 and upper and lower links 42, in the usual manner inherent in usual roller chains. As each ear 36 receives a pin 38 on the roller chain 39, and inasmuch as each ear 36 is fixed to its end wall 26, all end walls 26 may be adjusted simultaneously by adjustably moving the chain 39. The chain 39 engages teeth 43 on a sprocket 44 on the shaft 23, Fig. 2. The shaft 23 has a collar 45 fastened thereto, and the sprocket 44 which is loose on the shaft 23 is driven from the shaft 23 through the fixed collar 45. The sprocket 44 is adjustable with respect to the collar 45, and is driven by the collar 45 by means of set screws 46 seated in arcuate slots 47 in the collar 45, and threadedly engaging the sprocket 44. The sprocket 44, therefore, may be rotatively adjusted with respect to the driving collar 45, by merely loosening the screws 46, and then giving the sprocket 44 a predetermined part turn, whereby the chain 39 and consequently every end wall 26 will be shifted a predetermined extent to increase or decrease simultaneously the size of each measuring pocket 13 of each bucket 2. The screws 46 are screwed home tightly to lock the sprocket 44 in its adjusted position. Adjustment of the sprocket 44 with respect to its driving collar 45, therefore, causes simultaneous adjustment of the chain 39 and each end wall 26 of each bucket 2.

Each bucket 2 is made from cast bronze, or other desirable metal, and is relatively heavy in weight. Therefore, to prevent too much frictional drag on the supporting plate 3 upon which the buckets 2 engage, a roller 48, Fig. 2, is carried on the same side of the leg 10 as the boss 14 and the tongue 36 are located. The roller 48 is mounted on a shaft or pin 49 which is fixedly mounted on the inside face on the leg 10 of the bucket body 8, Fig. 2. The rollers 48 of the buckets 2 are adapted to roll upon a removable supporting plate 50 which is carried by a part of the machine frame.

The invention, therefore, comprises an endless conveyer 1 in the form of a continuously operating roller chain to which a plurality of adjacently arranged buckets 2 are connected. The article receiving pockets 13 of the buckets are capable of infinite and simultaneous adjustment. The size of the feed opening itself is limited in one direction by the space between the side legs 9 and 10 and in another direction by the space between the inner edge of the top closure plate 29 and the fixed end wall 11. The size of the pockets 13 may be varied or adjusted simultaneously by simultaneous adjustment of the movable end closure walls 26 by the adjustment of the chain 39. The closure wall 26 may be adjusted beyond the edge of the top plate 29 so that the size of the pocket 13 itself may be greater in area than the area defined by the feed opening, although it is probably desirable that the area of the pocket be coextensive with the area of the bucket feed opening.

The adjustment of the drive sprocket 44 with respect to the drive collar 45 on the drive shaft 23 permits the chain 39 to be shifted in either direction and thus adjust each movable end wall 26 at the same time. This arrangement provides simultaneous infinite adjustment of all the end walls and thus permits every pocket 13 to be set to the same size. It is believed, too, that the manner in which the end walls are detachably connected to the chain 39, as well as the detachable mounting of the buckets 2 on the chain 15, is new and novel. Moreover, as the chains 15 and 39 are located on the same side of the buckets, efficient operation and adjustment may be effected easily, and space is conserved.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A conveyor for packaging machines comprising a continuous chain, a plurality of adjacently positioned buckets removably mounted on said chain, each bucket having spaced legs, overhanging top flanges on said legs, said legs being spaced apart forming a space therebetween, an adjustable movable end wall closing one end of said space, an integral extension on one of said legs closing the other end of said space, said legs and end walls defining a measuring pocket, an extension on the movable end wall, a second chain connected to each movable end wall, and means to adjustably shift said latter chain to adjust each of said movable end walls simultaneously.

2. A conveyer for packaging machines comprising a plurality of hingedly connected buckets, each bucket having spaced legs, overhanging top flanges on said legs, said legs being spaced apart forming a space therebetween, an adjustable movable end wall closing one end of said space, an integral extension on one of said legs closing the other end of said space, an extension on the movable end wall, an endless chain connected to each latter extension, and means to shift said latter chain and thereby cause simultaneous shifting of each movable wall upon adjustment of said last named means.

3. A conveyor comprising a plurality of adjacently positioned buckets, each bucket having a body including spaced vertical side walls and a closed vertical end wall forming a slot open at one end of the body, a vertical wall adjustably movable in said opening to close the opening in the body, means connected to each movable wall, means to shift said last named means and consequently shift each movable wall simultaneously, a chain connected to each body, a second chain connected to each movable wall, interengaging means on said body and said chain, and interengaging means on the movable wall and another chain to mount said body and movable wall on their respective chains.

4. A conveyer comprising a plurality of adjacently arranged buckets each having enclosing walls defining measuring pockets, one of said walls being movable to adjust the size of pocket, a chain connected to each movable wall, and means to adjust said chain to adjust all said movable walls simultaneously upon adjustment of the chain.

5. A conveyer comprising an endless chain, adjacently arranged buckets detachably mounted on said chain, each bucket having enclosing walls defining a measuring pocket, one of said walls being movable, a second endless chain connected to each movable wall, and means to shift the second chain to shift said movable wall to vary the size of each pocket simultaneously.

6. A conveyer comprising an endless chain, a drive sprocket to drive the chain, pins projecting from said chain, adjacently arranged buckets detachably mounted on said pins, each bucket comprising enclosing walls defining a measuring pocket, one of said walls being movable, a boss on one wall having a hole therein receiving a pin on the chain whereby each bucket may be demounted from the chain by lifting the bucket to disengage the bucket from the chain, a drive shaft to drive the drive sprocket, and means connected to each movable wall to shift each movable wall simultaneously upon operation of said last named means.

7. A conveyer comprising an endless chain, a drive sprocket to drive the chain, pins projecting from said chain, adjacently arranged buckets detachably mounted on said pins, each bucket comprising enclosing walls defining a measuring pocket, one of said walls being movable, a boss on one wall having a hole therein receiving a pin on the chain whereby each bucket may be demounted from the chain by lifting the bucket to disengage the bucket from the chain, a drive shaft to drive the drive sprocket, a second endless chain connected to each movable wall, and means to adjust said latter chain to simultaneously adjust each movable wall and thus adjust the size of each measuring pocket simultaneously.

8. A conveyer comprising an endless chain, a drive sprocket to drive the chain, pins projecting from said chain, adjacently arranged buckets detachably mounted on said pins, each bucket comprising enclosing walls defining a measuring pocket, one of said walls being movable, a boss on one wall having a hole therein receiving a pin on the chain whereby each bucket may be demounted from the chain by lifting the bucket to engage the bucket from the chain, a drive shaft to drive the drive sprocket, a second sprocket mounted on said drive shaft, a second endless chain driven by said second sprocket and connected to each movable wall, and means to adjust said sprocket to shift said latter chain and thereby shift each movable wall simultaneously to vary the size of each pocket.

9. A conveyer comprising an endless chain, a drive sprocket to drive the chain, pins projecting from said chain, adjacently arranged buckets detachably mounted on said pins, each bucket comprising enclosing walls defining a measuring pocket, one of said walls being movable, a boss on one wall having a hole therein receiving a pin on the chain whereby each bucket may be demounted from the chain by lifting the bucket to disengage the bucket from the chain, a drive shaft to drive the drive sprocket, a second sprocket loosely mounted on said shaft, a collar fixed to said shaft, means providing relative adjustable rotative movement between the collar and the second sprocket, means to lock the collar and the latter sprocket in adjusted position, a second endless chain driven by said second sprocket, and means demountably connecting each movable wall to said second chain.

10. A conveyer comprising an endless chain, a drive sprocket to drive the chain, pins projecting from said chain, adjacently arranged buckets detachably mounted on said pins, each bucket comprising enclosing walls defining a measuring pocket, one of said walls being movable, a boss on one wall having a hole therein receiving a pin on the chain whereby each bucket may be demounted from the chain by lifting the bucket to disengage the bucket from the chain, a drive shaft to drive the drive sprocket, means connected to each movable wall to shift each movable wall simultaneously upon operation of said last named means, a second sprocket loosely mounted on said shaft, a collar fixed to said shaft, adjustable means between the latter collar and sprocket to adjust the sprocket rotatively with respect to the collar, a second endless chain driven by the second sprocket, and means connecting the movable end wall of each bucket to said second chain to adjust the size of each pocket simultaneously.

11. A conveyer comprising an endless chain, a drive sprocket to drive the chain, pins protecting from said chain, adjacently arranged buckets detachably mounted on said pins, each bucket comprising enclosing walls defining a measuring pocket, one of said walls being movable, a boss on one wall having a hole therein receiving a pin on the chain whereby each bucket may be demounted from the chain by lifting the bucket to disengage the bucket from the chain, a drive shaft to drive the drive sprocket, means connected to each movable wall to shift each movable wall simultaneously upon operation of said last named means, a second sprocket loosely mounted on said shaft, a collar fixed to said shaft, adjustable means between the latter collar and sprocket to adjust the sprocket rotatively with respect to the collar, a second endless chain driven by the second sprocket, means connecting the movable end wall of each bucket to said second chain to adjust the size of each pocket simultaneously, said last named means comprising pins on the second chain, and a projection on the movable end wall detachably engaging a pin on the second chain.

12. A conveyor comprising an endless chain, a drive sprocket to drive the chain, pins projecting from said chain, adjacently arranged buckets detachably mounted on said pins, each bucket comprising enclosing walls defining a measuring pocket, one of said walls being movable, a boss on one wall having a hole therein receiving a pin on the chain whereby each bucket may be demounted from the chain by lifting the bucket to disengage the bucket from the chain, a drive shaft to drive the drive sprocket, means connected to each movable wall to shift each movable wall simultaneously upon operation of said last named means, a second sprocket loosely mounted on said shaft, a collar fixed to said shaft, adjustable means between the latter collar and sprocket to adjust the sprocket rotatively with respect to the collar, a second endless chain driven by the second sprocket, means connecting the movable end wall of each bucket to said second chain to adjust the size of each pocket simultaneously, said adjustable means comprising arcuate openings in the collar, and set screws passing through the arcuate openings and threadedly engaging the second sprocket.

13. A conveyor comprising an endless chain, a drive sprocket to drive the chain, pins projecting from said chain, adjacently arranged buckets detachably mounted on said pins, each bucket comprising enclosing walls defining a measuring pocket, one of said walls being movable, a boss on one wall having a hole therein receiving a pin on the chain whereby each bucket may be demounted from the chain by lifting the bucket to disengage the bucket from the chain, a drive shaft to drive the drive sprocket, means connected to each movable wall to shift each movable wall simultaneously upon operation of said last named means, a second sprocket loosely mounted on said shaft, a collar fixed to said shaft, adjustable means between the latter collar and sprocket to adjust the sprocket rotatively with respect to the collar, a second endless chain driven by the second sprocket, means connecting the movable end wall of each bucket to said second chain to adjust the size of each pocket simultaneously, said last named means comprising pins on the second chain, a projection on the movable end wall detachably engaging a pin on the second chain, said adjustable means comprising arcuate openings in the collar, and set screws passing through the arcuate openings and threadedly engaging the second sprocket.

14. A bucket for a conveyer comprising a body having enclosing vertical side walls forming an opening, a movable end wall in said opening and defining a measuring pocket, a slotted projection on the movable end wall, a projection on the body slidingly receiving the projection, a member adapted to be shifted and connected to the movable wall whereby shifting of said member will shift said movable wall and adjust the size of the pocket.

15. A bucket adapted to form a part of an endless conveyer comprising enclosing walls defining a measuring pocket, one of said walls being movable to adjust the size of said pocket, a protuberance on one of said walls and having openings therein adapted to demountably receive pins on a chain, and an extension on said movable wall having a hole therein to receive a pin on a second chain, said protuberance and said extension being on the same side of the bucket.

16. A bucket adapted to form a part of an endless conveyer comprising enclosing walls defining a measuring pocket, one of said walls being movable to adjust the size of said pocket, a protuberance on one of said walls and having openings therein adapted to demountably receive pins on a chain, an extension on said movable wall having a hole therein to receive a pin on a second chain, said protuberance and said extension being on the same side of the bucket, and a pin on the bucket adapted to receive a roller for engagement with a rigid member to support the bucket, said latter pin being on the same side of the bucket as the protuberance and extension.

References Cited in the file of this patent

UNITED STATES PATENTS

| | | |
|---|---|---|
| 1,106,686 | Swarovski et al. | Aug. 11, 1914 |
| 2,358,292 | Malhiot | Sept. 12, 1944 |